United States Patent

Svajda

[15] 3,689,636
[45] Sept. 5, 1972

[54] COMPOSITION AND METHOD FOR DESENSITIZING SENSITIVE TEETH

[72] Inventor: Leonard J. Svajda, Corpus Christi, Tex.

[73] Assignee: Bentex Pharmaceutical Company, Houston, Tex.

[22] Filed: Oct. 24, 1969

[21] Appl. No.: 869,374

Related U.S. Application Data

[63] Continuation-in-part of Ser. No. 655,332, July 24, 1967, abandoned.

[52] U.S. Cl. ..................................424/49, 424/153
[51] Int. Cl. ..............................................A61k 7/16
[58] Field of Search.....................................424/153

[56] References Cited

UNITED STATES PATENTS 3,356,570   12/1967   Butcher....................424/153

*Primary Examiner*—Richard L. Huff
*Attorney*—Jacobi, Lilling & Siegel

[57] ABSTRACT

A composition and method for desensitizing sensitive teeth is disclosed. The composition comprises the chloride salts of calcium, magnesium, sodium, and potassium. According to a preferred embodiment of this invention, the compositions are formed by mixing saturated solutions of each salt. The compositions can be applied to the gingival crevices or other sensitive areas of the teeth.

3 Claims, No Drawings

COMPOSITION AND METHOD FOR DESENSITIZING SENSITIVE TEETH

This application is a continuation-in-part of applicant's copending application, Ser. No. 655,332, filed July 24, 1967, and now abandoned.

This invention relates to a composition, and method, for the desensitization of sensitive teeth.

A widespread complaint among people in all strata of society and in many parts of the world is that of excessive sensitivity of the teeth to external stimuli. They find that their teeth have become extremely sensitive to the application of heat and/or cold, inhalation of air, physical contact such as that which occurs while brushing the teeth, and various other types of stimuli. The cause of this discomfort may be one of several known physical conditions.

If a dentist is compelled to drill too near the pulp of the tooth when filling a cavity, the filling he then inserts may be placed too close to the unprotected pulp. Unless a proper basing is placed under the filling material prior to its insertion, the patient will experience undue sensitivity to one or more of the aforementioned stimuli. Sensitivity caused by such a deep-seated filling cannot be permanently relieved by topical application of any medication, but only by providing a proper basing under the filling material.

The above cause of tooth sensitivity may be termed "internal." Other causes are of an "external" nature. External causes include, for example, chemical or mechanical erosion through the enamel into the nerve-containing dentinal matter of the tooth, as well as the exposure of the dentine due to a receding gum. Improper brushing of the teeth or the use of abrasives in dentifrices can and does cause erosion of a mechanical type which penetrates the enamel into the nerve-laden dentine. The use of lemon juice, vinegar, and other acidic foods produces a chemical erosion of tooth structure causing dentinal involvement and subsequent sensitivity. As for gums, gingival diseases are common causes of the same, thereby exposing the dentine of the tooth at the dentino-enamel junction.

Several products are available for the desensitization of sensitive teeth caused by external factors, and work with varying degrees of success. One or more severe limitations are associated with most of these products, these limitations including cost and inconvenience of application.

There thus remains a need for a conveniently applicable, low cost, composition for desensitizing teeth, and the present invention, quite unexpectedly reveals that this need can be satisfied.

OBJECTS OF THE INVENTION

Specifically, it is the primary object of the invention to provide an effective composition for at least significantly lowering the sensitivity of sensitive teeth to external factors, which composition can be easily applied and made available at reasonable prices.

Consistent with this primary object, it is a further object hereof to provide such a composition which is an aqueous solution, thereby facilitating its application and use, and which consists essentially of comparatively inexpensive and readily available constituents, namely calcium chloride, magnesium chloride, sodium chloride and potassium chloride.

Still another, most important object of this invention, is to provide such a composition in which the essential constituents are present in effective, yet preferably, given ranges of concentration.

Aside from the significant composition aspects hereof, the invention is also concerned with a method of desensitizing teeth which may be sensitive to differing degrees, and accordingly a further important object hereof is to provide a method of desensitizing teeth, which method makes it possible to fully realize all the advantages afforded by the composition hereof by topical application thereof to the teeth involved.

The invention will be better understood and objects other than those set forth above will become apparent after reading the following detailed description of preferred, yet illustrative, embodiment hereof.

DETAILED DESCRIPTION OF THE INVENTION

Nature of Composition

The composition of this invention is an aqueous inorganic chloride salt composition comprising calcium chloride, magnesium chloride, sodium chloride and potassium chloride. Each of the chloride salts are present in an amount effective to significantly lessen the sensitivity of teeth upon topical application thereto and contact with the teeth.

The various hydrate forms of magnesium chloride and calcium chloride can be used in combination with the sodium and potassium chloride salts. Examples of the hydrated forms of calcium chloride include the monohydrate forms ($CaCl_2 \cdot H_2O$), dihydrate forms ($CaCl_2 \cdot 2H_2O$) and the hexahydrate form ($CaCl_2 \cdot 6H_2O$). Examples of the hydrated forms of magnesium chloride include, for example, the hexahydrate form ($MgCl_2 \cdot 6H_2O$). The compositions of this invention are formed by mixing together in an aqueous solution, either the anhydrous or hydrous forms of the various salts employed.

The relative amount of each salt which should be present in the composition in order to render the composition effective to significantly lessen the sensitivity of teeth upon topical application thereto and contact with the teeth is from about 5.3 to about 44.6 weight percent calcium chloride, from about 3.7 to about 38.1 weight percent magnesium chloride, from about 3.2 to about 21.0 weight percent potassium chloride and from about 3.2 to about 26.9 weight percent sodium chloride, and the balance being water. The amounts of each ingredient is based on the anhydrous forms of each salt.

According to a preferred embodiment of the invention, calcium chloride dihydrate ($CaCl_2 \cdot 2H_2O$) and magnesium chloride hexahydrate ($MgCl_2 \cdot 6H_2O$) are employed in combination with sodium chloride and potassium chloride. Due to the different water of hydration with respect to the calcium and magnesium chloride salts, the $CaCl_2 \cdot 2H_2O$ is present in an amount of from about 7 to about 59 weight percent and $MgCl_2 \cdot 6H_2O$ is present from about 8 to about 81.5 weight percent.

For best results, it appears from preliminary clinical testing that the composition is desirably a saturated aqueous solution of the chloride salts mentioned hereinbefore. According to a preferred embodiment of the invention, the composition comprises a mixture of equal parts of saturated aqueous solutions of:

$CaCl_2 \cdot 2H_2O$ $MgCl_2 \cdot 6H_2O$

NaCl

KCl

The relative amounts of each ingredient present in this composition is about 14.1 weight percent $CaCl_2 \cdot H_2O$, 17.4 weight percent $MgCl_2 \cdot 6H_2O$, 6.4 weight percent KCl and 6.4 weight percent NaCl with water accounting for the balance of the composition.

This preferred saturated aqueous solution is prepared by mixing saturated water solutions of each inorganic compound in equal amounts. The procedure is as follows:

1. Add 1,000 ml. distilled water and 916.6 g. of calcium chloride dihydrate ($CaCl_2 \cdot 2H_2O$) to a 3 liter container.
2. Add 1,000 ml. distilled water and 1,833.6 g. of magnesium chloride hexahydrate ($MgCl_2 \cdot 6H_2O$) to a 4 liter container.
3. Add 1,000 ml. distilled water and 392.8 g. potassium chloride KCl to a 2 liter container.
4. Add 1,000 ml. distilled water and 392.8 g. sodium chloride (NaCl) to a 2 liter container.
5. Heat each container in steps 1 through 4, while stirring, until each salt is completely dissolved.
6. Allow solutions to cool overnight at room temperature.
7. The following day: filter each solution into a separate container.
8. Add 1,000 ml. of each filtered solution to a container and mix well.
9. Allow the mix to stand overnight at room temperature.
10. Filter solution.

Various optional ingredients can also be used in the practice of this invention. Ingredients which can be added, in minor amounts, to the compositions include, for example, flavoring additives, color additives, preservatives and the like.

PROCESS OF UTILIZING COMPOSITION

The application of the composition is a simple and safe procedure, and requires no special training. The patient, himself, can apply the composition topically to the surface of the teeth with a cotton swab or the like. According to a preferred method of application, the patient initially dries his teeth by means of a cloth or tissue or similar substance in order to remove all traces of sticky saliva. This preliminary drying procedure permits the composition to come into direct and immediate contact with the sensitive tooth structure, which contact would otherwise be impeded by the presence of saliva. After the teeth preferably have been thoroughly dried, a cotton swab or the like is used to apply the composition in generous portions to the affected teeth, i.e., the teeth are preferably bathed in the aqueous solutions. From a practical standpoint, one of the advantages of the invention is that excessive amounts of the composition made consistent herewith can be applied without danger to the teeth or other human tissues. This does not mean that the composition should be used without discretion, and instead, the point of importance is that some extra solution will cause no damage. Using tissues, or other absorbent substance, the patient can prevent the influx of unwanted saliva into any particular area by damming off such an area for the time of the application. Preliminary studies indicate that the solution preferably remains on the teeth, under the gum flap, and between the teeth for about 3 minutes for each application. Several applications can be made in a twenty-four hour period, and it appears that the treatment is used for at least one day before appreciable results are noted. After the application of the desensitizing solution, and the proper waiting period, the mouth is preferably rinsed with water.

While it is not presently known how or why the solution of the invention yields the desired results, it is possible that such results can be explained by reference to one of two theories, neither of which is to be considered in any way limiting. It is known that the nerve fiber is made of protoplasm and transmits impulses in a manner not unlike an electric wire. According to one theory of the efficacy of the composition and the method of this invention, the composition stimulates a coagulation of the protoplasm within the cell body of the nerve cell, thereby rendering it less responsive to stimuli of all sorts.

Another theory, however, explains the desensitization on the basis that the composition causes a change in the bio-electric nature of the nerve itself effecting its impulse transmission abilities. According to this theory, the highly ionic solution of this invention, is used to bathe the sensitive teeth, thus contacting the sensory areas. This flood of ions in this area causes an ionic imbalance in the sensory nerve cell membrane to ions and effectively changes the ionic concentration inside the nerve cell. Since it is now generally accepted that the transmission of nerve impulses is directly related to the membrane permeability to ions and the ionic concentration in the nerve, this imbalance blocks the pain generally transmitted. Yet it should be understood that there is no definitive evidence at the moment which either proves or disproves one or both of the aforementioned theories and, accordingly, the same are mentioned only for completeness and potentially accurate explanation purposes.

Illustrative Examples

EXAMPLE 1

A composition was made consisting of the following:

| Ingredient | Amount (in Grams) |
|---|---|
| $CaCl_2 \cdot H_2O$ | 41.2 |
| $MgCl_2 \cdot 6H_2O$ | 56.9 |
| NaCl | 17.9 |
| KCl | 13.8 |
| $H_2O$ | 175.0 |

This solution was given to several patients with sensitive teeth. The applied it several times a day by drying their teeth with tissue, applying the solution with a cotton swab to the teeth, allowing the solution to remain on the teeth for at least 3 minutes, and then rinsing the mouth with water. They all reported a substantial decrease in sensitivity.

EXAMPLE 2

Saturated aqueous solutions were made at room temperature of $CaCl_2 \cdot 2H_2O$, $MgCl_2 \cdot 6H_2O$, KCl and NaCl. The concentration of each of these solutions were as follows:

| Ingredient | Amount per 100 grams of water |
|---|---|
| $CaCl_2 \cdot 2H_2O$ | 59.0 grams |
| $MgCl_2 \cdot 6H_2O$ | 81.5 grams |
| KCl | 21.0 grams |
| NaCl | 26.9 grams |

These saturated solutions were then mixed to form the following composition:

| Ingredient | Percent by Weight |
|---|---|
| $CaCl_2 \cdot H_2O$ | 14.1 |
| $MgCl_2 \cdot 6H_2O$ | 17.4 |
| KCl | 6.4 |
| NaCl | 6.4 |
| $H_2O$ | 55.7 |

Samples of this solution were used to treat 150 patients in order to evaluate the efficacy of the product. More particularly, the purpose of the test was to evaluate this composition in terms of:
1. number of days for noted improvement,
2. number of days for desensitizing teeth, and
3. number of days for recurrence of sensitivity, if any.

All those patients selected for this study were diagnosed as having sensitivity of the teeth with etiology including exposed dentine, gingival hypersensitivity, erosion, post gingivectomy, low grade pulpitis, gingival recession, vigorous tooth-brushing and related causes.

After the initial examination, the patient was given the first application in a dentist's office. The patient was then given a small bottle of the solution to take home with him, and was instructed by the dentist to apply the solution as directed. Eighty-five (85) of the patients were instructed to apply the medication three times daily for 7 days. Twenty (20) patients were given 1 application only, and the remaining 45 patients administered random applications as needed throughout the 7-day period. The results are reported herein.

Each patient was instructed to report to the dentist 2 or 3 days after the initial visit to determine if and when improvement was noted. After a 90-day period, each patient again was instructed to return to the office. This time the dentist applied cold water, air, metal instrument, or other stimuli to determine whether there had been a recurrence of the sensitivity.

SUMMARY OF THE RESULTS

Of the 150 patients started on the medication, there were 8 patients who did not use it. Therefore, the result reported herein is based on the 142 patients who used the solution as directed. The findings are as follows:
1. The number of days for noted improvement averages 3.9 days.
2. Two (2) patients failed to return for the next examination and of the remaining 140 patients who returned, 15 of them did not respond to the treatment, and no improvement was evident. However, the remaining 125 patients were completely desensitized over a period averaging 6.6 days.
3. The 90-day recurrence examination showed that of the 125 patients reporting, there were 14 who had sensitivity recurrence within this period. This would indicate an 8.9 percent failure. During this period the recurrence of sensitivity for these patients averaged 52.1 days.
4. A final examination was given each patient for whom the medication was effective. This test indicated that of the 125 patients who continued treatment, the medication showed 91.1 percent effectiveness after an average of 112 days of observation.

Of the 85 patients who applied the medication 3 times daily for 7 days, the results are as follows:

Seven 7 patients did not use the medication, and 5 showed no improvement at all. Based on the remaining 73 the results show:
1. The number of days for noted improvement averaged 4.9 days, usually the time before reporting.
2. Of these 73 patients, 1 did not return for examination, and 7 failed to respond to treatment. The remaining 65 patients became completely desensitized over a period averaging 8.2 days.
3. Of these 65 patients who were scheduled for final 90-day examination, 1 failed to report, leaving 64 patients of which 8 showed a recurrence of sensitivity within an average of 60 days.
4. The remaining 56 patients were observed over an additional period averaging 138 days with no sensitivity reported.

RESULTS OF PATIENTS HAVING ONLY ONE APPLICATION

Twenty (20) random selected patients had only one application given in the dentist office. The results were as follows:
1. The number of days for noted improvement averaged 1 day.
2. The number of days for complete desensitization averaged 1 day.
3. Of the 20 patients scheduled to report for the 90-day recurrence test, 2 patients did not report. Of the 18 remaining subjects, only 1 had a recurrence of sensitivity in 130 days.
4. The 18 subjects were observed over an additional period averaging 130 days with no sensitivity reported.

The results of the 45 patients who administered the medication as needed are not mentioned separately, but are included in the summary collectively with the other two groups.

While some hydrated salts were used in the examples due to their ready availability, it is to be understood that anhydrous salts can also be used without departing from the scope of the invention, the difference in proportions being readily calculable.

After considering the foregoing description and the immediately preceding examples, it should be apparent that the objects set forth at the outset of this specification have been successfully achieved.

What is claimed is:

1. A method of desenitizing sensitive teeth comprising topically applying to the teeth an aqueous inorganic chloride salt composition comprising a saturated aqueous solution of equal parts of saturated aqueous solutions of calcium chloride dihydrate, magnesium chloride hexahydrate, sodium chloride and potassium chloride.

2. The method of claim 1 further comprising topically applying said composition to the teeth and allowing said composition to remain in contact with said teeth for at least 3 minutes.

3. The method of claim 2 further comprising removing essentially all the saliva from said teeth prior to applying said composition to said teeth.

* * * * *